(12) United States Patent
Vaughan et al.

(10) Patent No.: US 9,818,198 B2
(45) Date of Patent: Nov. 14, 2017

(54) METHOD FOR NEAR-REALTIME WORKSPACE MAPPING (71) Applicant: University of Louisiana at Lafayette, Lafayette, LA (US)

(72) Inventors: Joshua Vaughan, Lafayette, LA (US); Mohammad Sazzad Rahman, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 94 days.

(21) Appl. No.: 14/886,600

(22) Filed: Oct. 19, 2015

(65) Prior Publication Data
US 2016/0110625 A1 Apr. 21, 2016

Related U.S. Application Data (60) Provisional application No. 62/066,642, filed on Oct. 21, 2014.

(51) Int. Cl.
G06K 9/00 (2006.01)
G06T 7/00 (2017.01)
G06T 7/11 (2017.01)
G06T 7/194 (2017.01)

(52) U.S. Cl.
CPC ........ *G06T 7/0044* (2013.01); *G06K 9/00771* (2013.01); *G06T 7/11* (2017.01); *G06T 7/194* (2017.01); *G06T 2200/32* (2013.01); *G06T 2207/10024* (2013.01); *G06T 2207/20032* (2013.01); *G06T 2207/20152* (2013.01)

(58) Field of Classification Search
CPC ..... G06T 7/0044; G06T 2200/32; G06T 7/11; G06T 2207/20152; G06T 2207/10024; G06T 2207/20032; G06T 7/194; G06K 9/00771
USPC ........................................................ 382/103
See application file for complete search history.

(56) References Cited

U.S. PATENT DOCUMENTS 5,579,444 A * 11/1996 Dalziel ................. B25J 9/1697
382/153
7,286,683 B2 * 10/2007 Hadell .................... B66C 13/46
348/E7.09

(Continued)

Primary Examiner — Gregory F Cunningham
(74) Attorney, Agent, or Firm — Russel O. Primeaux; Robert Devin Ricci; Kean Miller LLP (57) ABSTRACT Motorized machinery, such as overhead cranes, are widely used in industries all over the world. It is not easy to move crane payloads without oscillation, increasing the likelihood of obstacle collisions and other accidents. One possible solution to such problems could be aiding the operator with a dynamic map of the workspace that shows the current position of obstacles. This method discloses the use of a camera to take images of the workspace, using imaging blurring to smooth the obtained images, and drawing contours to produce an individual, near real-time map of the workspace. In one or more embodiments, known obstacles may be tagged in a manner which is readable by the camera. This image and historical images of the same workspace are layered on top of one another to produce a map of obstacles on the workspace floor. This imaging and layering can produce a near real-time map of obstacles that can be used to guide heavy motorized machinery around a workspace without incident.

17 Claims, 8 Drawing Sheets

Flow Chart of The Mapping Process

(56) References Cited

U.S. PATENT DOCUMENTS

| | | | | |
|---|---|---|---|---|
| 8,565,520 | B2 * | 10/2013 | Williams | G06T 19/006 |
| | | | | 382/164 |
| 9,415,976 | B2 * | 8/2016 | Hermann | B66C 13/46 |
| 2011/0153136 | A1 * | 6/2011 | Anderson | G05D 1/0219 |
| | | | | 701/25 |
| 2012/0310532 | A1 * | 12/2012 | Snoeck | G06Q 10/06 |
| | | | | 701/482 |
| 2013/0032561 | A1 * | 2/2013 | Singhose | B66C 13/40 |
| | | | | 212/273 |
| 2013/0236098 | A1 * | 9/2013 | Fujisaki | G06T 7/0081 |
| | | | | 382/171 |
| 2014/0104415 | A1 * | 4/2014 | Fox | H04N 5/332 |
| | | | | 348/135 |
| 2014/0160349 | A1 * | 6/2014 | Huang | H04N 5/2252 |
| | | | | 348/375 |
| 2014/0219581 | A1 * | 8/2014 | Astrand | G06T 3/4038 |
| | | | | 382/284 |
| 2015/0336274 | A1 * | 11/2015 | Connell, II | B25J 9/1697 |
| | | | | 700/259 |
| 2016/0314622 | A1 * | 10/2016 | Davis | G06T 19/006 |

* cited by examiner

FIGURE 1

Flow Chart of The Mapping Process

FIGURE 2

Image Acquisition for Mapping

FIGURE 3

Marker Image Used for Seeding

FIGURE 4

Segmented Image After Contours Are Drawn

FIGURE 5

Individual Maps Used in the Final Map

FIGURE 6

Crane Workspace Map

FIGURE 7

Flow Chart of Mapping Algorithm Using QR Code

FIGURE 8

Determination of Rectangular Object Vertices from QR Code Data

METHOD FOR NEAR-REALTIME WORKSPACE MAPPING

CROSS REFERENCE TO RELATED APPLICATIONS

This application claims priority to U.S. Provisional Patent Application No. 62/066,642, entitled "Method For Near-Realtime Workspace Mapping," which was filed on Oct. 21, 2014.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments of the Method For Near-Realtime Workspace Mapping, which may be embodied in various forms. It is to be understood that in some instances, various aspects of the invention may be shown exaggerated or enlarged to facilitate an understanding of the invention. Therefore the drawings may not be to scale.

BACKGROUND OF THE INVENTION

Field of the Invention

The subject matter of the present invention generally relates to machine operation safety. More particularly, the present invention relates to using mapping techniques to avoid overhead crane collisions and accidents.

Background

Overhead cranes are widely used in industries all over the world. In many overhead cranes, the payload is suspended from a trolley that moves along a bridge. In some, the bridge itself can also move, enabling the crane to serve a large area. Due to their wide use throughout multiple industries, accidents in overhead crane operation remain a problem, causing damage and injuries. According to Crane Inspection and Certification Bureau, 90% of all crane accidents occur due to human error. Half of U.S. crane accidents that had injuries in 2009 resulted in fatalities. It is not easy to move crane payloads without oscillation, increasing the likelihood of obstacle collisions and other accidents. Some reasons for these incidents are limitations of the operator's field of view, depth perception, knowledge of the workspace, and the dynamic environment of the workspace.

Control techniques like input shaping have been used to reduce the probability of crane collisions with obstacles. However, numerous factors, such as lack of knowledge of the workspace and common limitations in human perception of distance and depth, still limit the ability of the operator to safely move a crane through a workspace. Certain companies have tried to limit accidents by employing virtual boundaries around obstacles in the crane workplace; however, such boundaries typically have to be manually entered through a programming interface or a series of offline obstacle identification steps.

Research has been conducted to model the workspace in order to avoid crushing obstacles during operations of heavy equipment. In addition, vision systems have been used for mapping and navigation for mobile robots and developing augmented reality workspaces. Simultaneous Localization and Mapping (SLAM) is a well-established method for mapping an unknown environment, or updating a map within a known environment by mobile robots and autonomous vehicles while at the same time keeping track of their current locations. Machine vision systems have also been implemented on tower cranes to help the operator see the workspace clearly. Some researchers have used machine vision as a means of measuring the crane hook location for feedback control, and some have conducted research into crane control for obstacle avoidance. However, in this work, there was no attempt to map the crane workspace.

A solution to the aforementioned limitations is aiding the operator with a map of the workspace that depicts the current position of obstacles for use in crane operation. The map could be extended to include information about past locations of obstacles as well. The past locations could be an indication of the possibility of finding an obstacle at a given location in the workspace. This map could later be used to create virtual boundaries around the obstacle locations indicated by the map, actively preventing the collision between payload and obstacles. This method describes a novel approach of mapping the crane workspace in near-realtime using machine vision.

DETAILED DESCRIPTION OF THE INVENTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. One skilled in the relevant art will recognize that the method may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method's process. For instance, an arrow may indicate a waiting or monitoring period of unspecified duration between enumerated steps of the depicted process. Additionally, the order in which a particular method occurs may or may not strictly adhere to the order of the corresponding steps shown.

Figure 1:
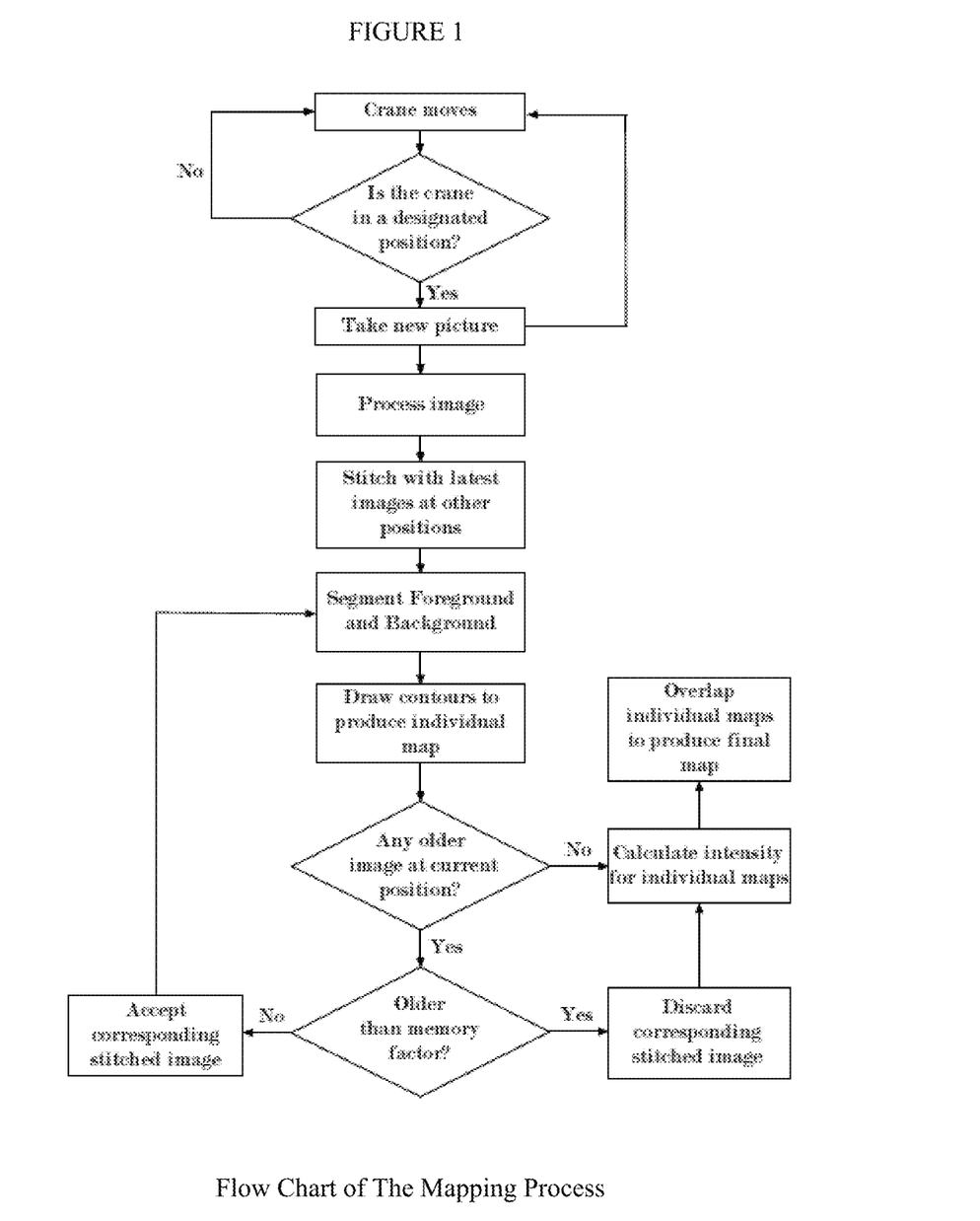
FIG. 1 depicts a flowchart of one embodiment of the disclosed method, describing the process of mapping obstacles within a machine's workspace.

FIG. 1 depicts, generally, a flowchart of one embodiment of the disclosed method, describing the process of mapping obstacles within a machine's workspace. This method produces a near-realtime workspace map by first taking pictures of the workplace. In the preferred embodiment, a camera has been mounted onto a crane trolley that automatically takes a picture at predefined points in the workspace while carrying on its normal operation. In each image, the background is detected, and the crane hook is masked. Once the obstacles are identified, a graphical representation of the workspace is generated. In order to eliminate noise in the images, the workspace images are first blurred. Blurring smooths the images by reducing image noise and details. Gaussian blur and median blur are two of the most commonly used methods for blurring and either or both may be used in this work. It is understood that other blurring techniques may be used in various embodiments of the present disclosure. Moreover, the means for reducing noise may not incorporate blurring or may only partially blur objects. In some embodied applications, median blur may be more desirable because it retains sharp edges while blurring.

To separate the obstacles from the background, it is necessary to detect the background. If the background is known, a simple thresholding can be used to separate the background from the foreground. However, depending on the noise level and lighting, the background of the workspace may vary significantly. Moreover, the reflections of the lighting source and the shadows of the objects can make it difficult to distinguish the obstacles from the background using simple thresholding. A simple way to select the average background is calculating the image histogram for all the channels of a color image. It is assumed in this illustrative example that the background occupies a larger area than the obstacles. In this case, the most frequent pixel value is the selected background value for each channel.

Figure 2:
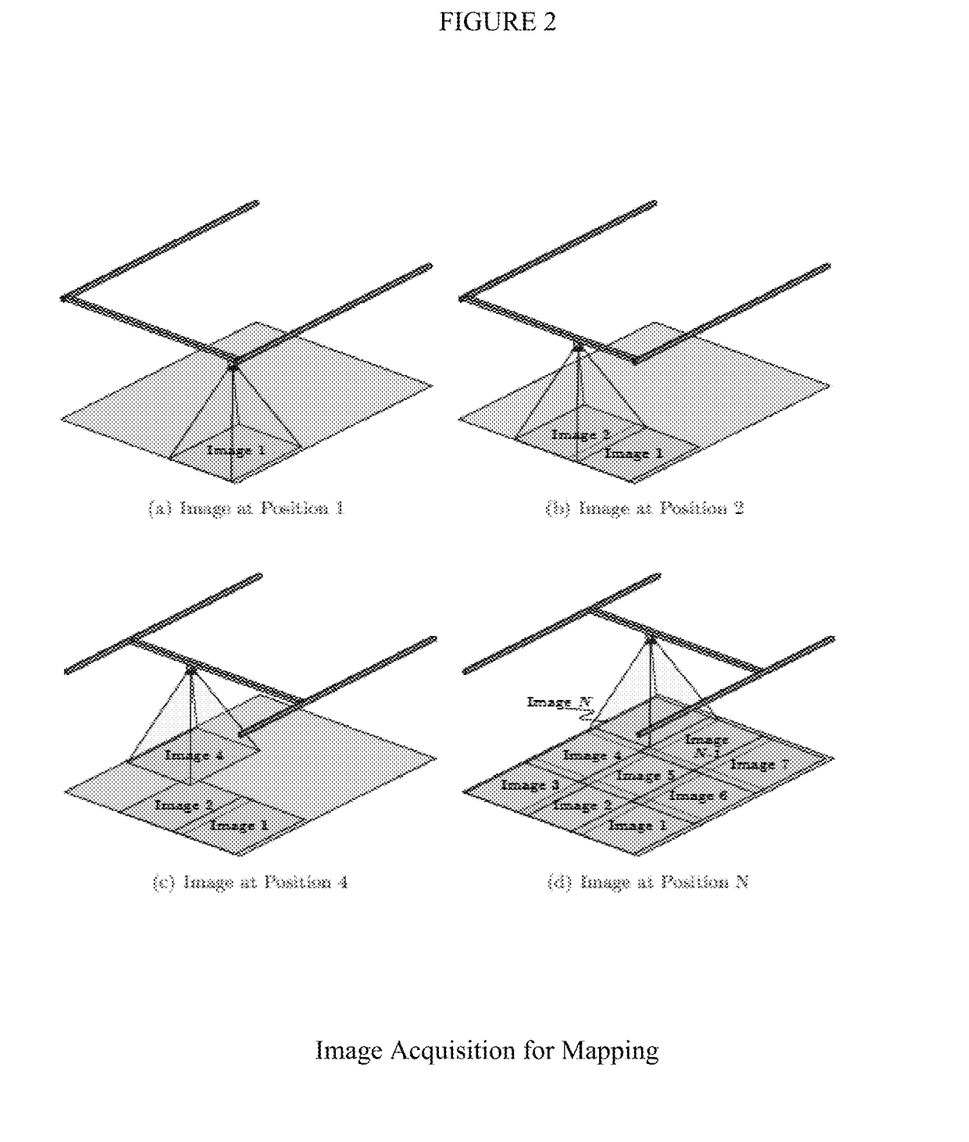
FIG. 2 is an example of an image acquisition process wherein the workspace is divided into segments or regions such that multiple pictures can be taken and stitched together if desired to form one map.

In some applications, the camera cannot capture the entire workspace in a single image. In such an application, numerous individual images will need to be taken and stitched together. FIG. 2 shows an embodiment of the image acquisition process which is automated. In other embodiments, the image acquisition process may be performed manually. The workspace is divided into segment(s), and a picture is taken in each segment to cover the entire workspace. When the crane trolley reaches one of these regions, the camera automatically takes a picture. Then, it waits until it moves to another position or for a certain period of time if it stays at the same position, before taking the next picture. This automatic image acquisition works parallel to the normal crane operation. There is no stoppage time. However, for the first-time operation, it may be recommended that the crane be moved through the entire workspace.

However, when this method is used for a crane, because the camera would be mounted directly over the crane hook, there will always be the crane hook/payload in the image. A simple solution is to cover that part of image with the background color calculated. One way to locate the hook in the image is using known methods for template matching. After locating the hook and calculating its dimensions, it can be masked. After masking, the images can be stitched together.

Multiple known means can be used to stitch the images together. By way of illustrative example, the well-known OpenCV stitching pipeline can be used to stitch images, which uses automatic panoramic image stitching using invariant features. This algorithm can seamlessly stitch multiple images irrespective of order or brightness, which makes it suitable for the mapping algorithm. It can also handle small rotations and blends the images seamlessly. In this algorithm, the SIFT (scale-invariant feature transform) features of all the images to be stitched are extracted and matched. RANSAC (random sample consensus) is used to find the feature matches between images that are geometrically consistent, and a probabilistic model is used to verify those matches. Then, connected components of the images are found and bundle adjustment is performed to simultaneously solve for all the camera parameters. The images are then straightened and blended together using multi-band blending so that the output stitched image is smooth.

Figure 3:
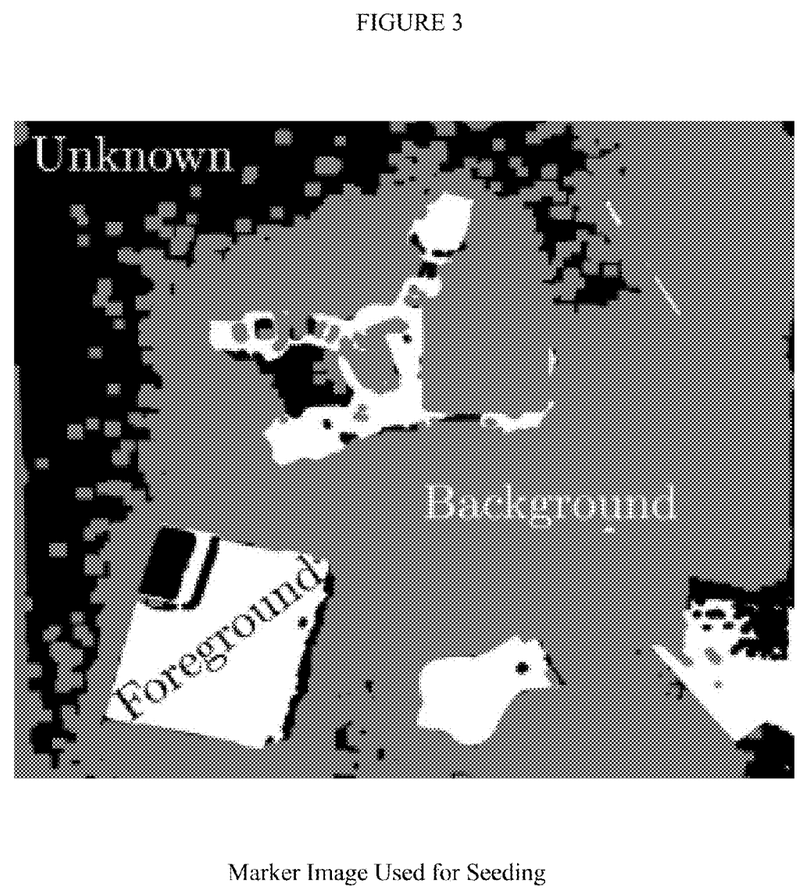
FIG. 3 depicts a processed image of the workspace that has been thresholded to create an image of workspace obstacles. In this Figure, the background is marked in grey, the foreground is marked in white, and the rest of the image is black.

Various techniques can be employed for foreground-background segmentation, including watershed transformation, graph partitioning methods, and region-growing methods, and integration of multiple cues. For illustrative purposes, a watershed transformation method is used in the instant embodiment because it generally provides closed contours with a low level of noise and low computation time. Thus, the watershed algorithm will be applied for obstacle detection. To do so, a marker image should be created where a portion of the foreground and background are marked. The foreground and the background of the image are segmented by the watershed algorithm based on these marked areas. To create the marker, the image is thresholded twice, through two three-channel scalars about the previously-selected background value. For the first thresholding operation, the threshold scalar range is larger, so that only the portions of image that fall outside the threshold range are sure to be the foreground and are marked as such. For the second thresholding operation, the threshold range is smaller, so that only the parts of the image that fall inside the threshold range are sure to be the background and are marked as background. Then, a marker is created and the aforementioned regions are labeled inside it. An example of such a marker image is shown in FIG. 3, where the background is gray, the foreground is white, and the rest of the image is black.

Figure 4:
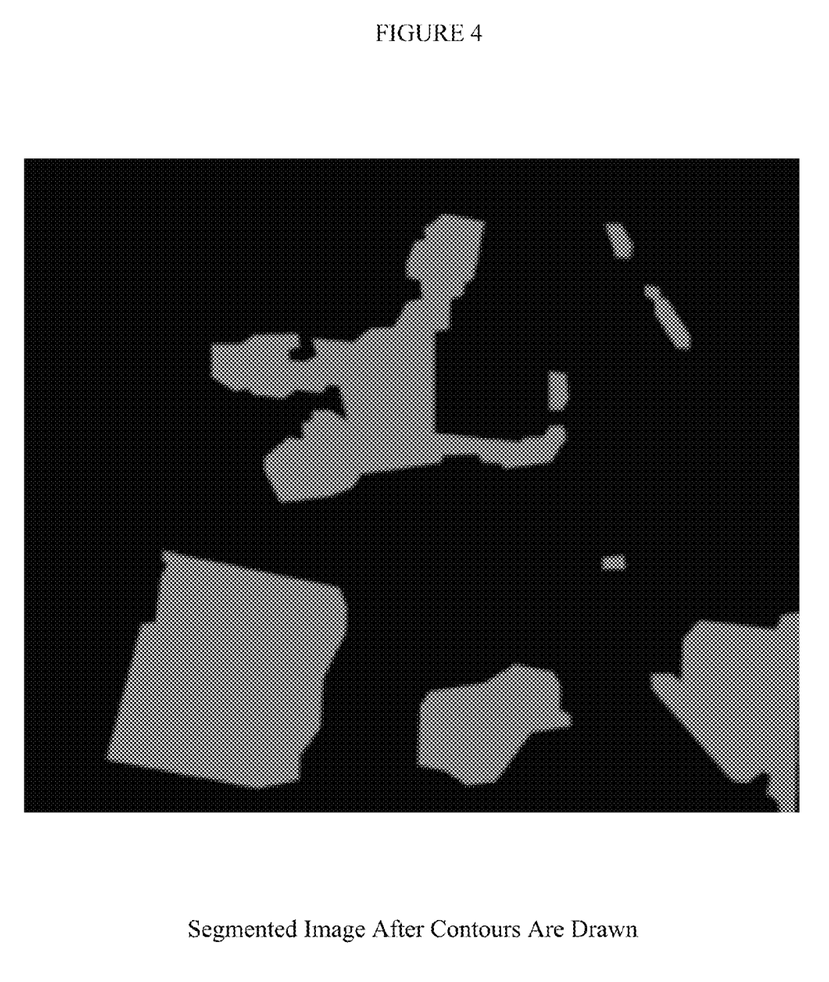
FIG. 4 depicts the processed image of the workspace that has been segmented, and the contours of such obstacles are extracted from the segmented image.

Once the marker is determined, the watershed algorithm is applied to obtain the segmented image. The contours of the obstacles are extracted from the segmented image. Then, a polygonal curve is estimated and the contours are drawn, as can be seen in FIG. 4. Numerous means can be employed to estimate the polygonal curve including, but not limited to, an application of the Douglas-Peucker algorithm.

The mapping process provided in this disclosure has the capability of taking both the latest and older positions of the obstacles into account. The older positions of obstacles can be used as an indicator of the likelihood of there being an obstacle at that location in the future. Each time a new picture is taken by the camera at a particular position, an individual map is generated by stitching that picture with the most recent pictures at other positions. Then, a final map is created by overlapping the latest map with older individual maps. The individual maps are overlapped in a way that the latest map is shown in red to indicate certainty of finding an obstacle. Older maps are shown in a different hue or color, such as yellow, than the new map(s), the intensity of which decreases with time when those maps were generated. For example, in one embodiment, the intensity can be set to decrease according to:

$$I_i = 100 e^{-cm2ti/(t0-t1)}$$

where $I_i$ represents percentage intensity of $i^{th}$ map, m is the number of maps available, c is a scaling factor, $t_i$ represents time since $i^{th}$ map, and $t_1$ and $t_0$ represent time since the most recent map and the oldest map, respectively. The scaling factor actually used can depend on the workspace conditions and the frequency with which the map is updated. For example, if the map is updated very often, a higher value of c may be chosen so that there is tangible contrast between maps. On the other hand, if the map is updated less often, a lower value of c may be chosen so that the older maps are still visible.

Figure 6:
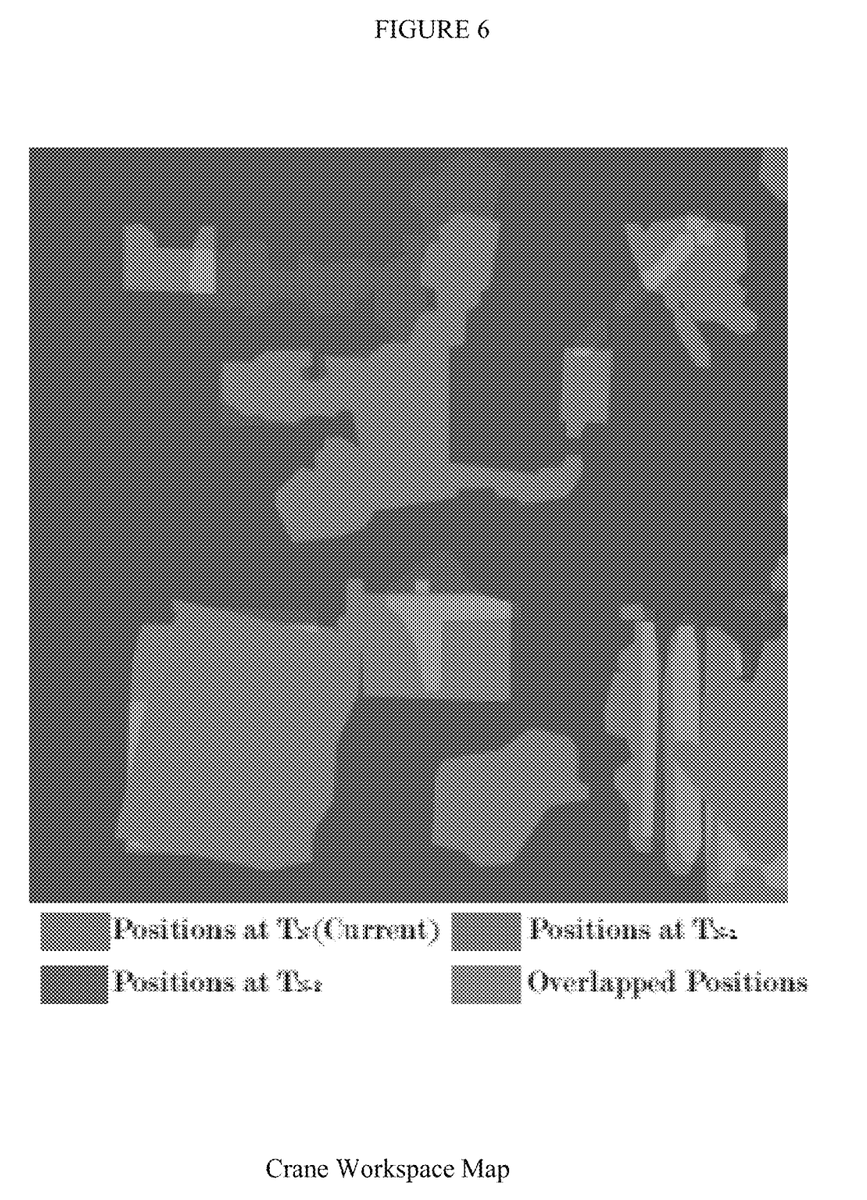
FIG. 6 depicts an example map resulting from the disclosed method in which the three maps from FIG. 5 have been overlaid wherein the hue or intensity suggests the higher probability of finding an obstacle in a location.

Relatively recent maps are more likely to indicate an actual obstacle position. Therefore, to account for this shift through time, the intensity of older images decreases as time progresses to indicate the decreased certainty of finding an obstacle at that location. As shown in FIG. 6, the intensity depends both on number of images available and time when the image was taken. With respect to time, intensity approaches linearity when the number of images available is reduced, making sure that the images do not lose weight to quickly when not many images are available in a particular location. If there is an overlap in the obstacle locations from past images, the overlapped area is brighter than in the individual maps. The overlapped area indicates there has been an obstacle present at these locations in the workspace at multiple times in the past. Thus, the intensity can be used to suggest that the probability of finding an obstacle there in the future is greater such that a higher intensity corresponds with a higher probability of an obstacle being present.

Figure 5:
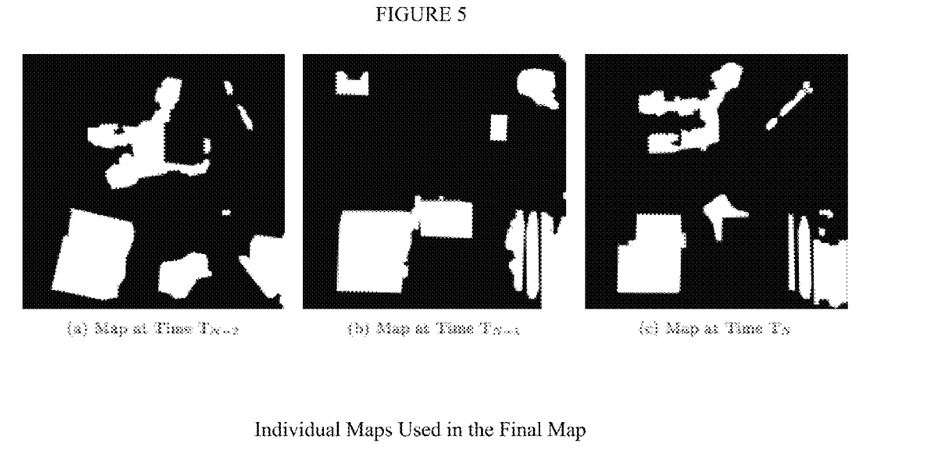
FIG. 5 depicts three individual process image maps of the workplace at times $T_N$, $T_{N\_1}$, and $T_{N\_2}$.

If an individual map is too old, it can be discarded as it is unlikely to indicate a probable future location of an obstacle. Moreover, if too many old maps are overlapped, the mapping may become cluttered and confusing to understand. To account for this issue, a memory factor can be used to determine the age and relativity of an individual map. The larger the memory factor is, the older an individual map can be and still be taken into account for generating the final map. For example, in an embodiment wherein the number of images is set to 2, the memory factor is calculated using:

$$M_{x,y} = t_{0x,y} e^{-nc1} \text{ if } n > 2$$

and $$M_{x,y} = t_{0x,y} \text{ if } n \leq 2$$

where $M_{x,y}$ is the memory factor at position (x, y), $t_{0x,y}$ is the time since the oldest image available at position (x, y), n represents number of images available at position (x, y), and c1 is a scaling factor. If an image at position (x, y) is older than $M_{x,y}$, then it is forgotten. At a particular location, the memory factor is a function of both number of images, n, and time since the oldest available image, $t_{0x,y}$. For a particular $t_{0x,y}$, the memory factor reduces exponentially with number of images available. If a large number of images are available, the memory factor is smaller, so that more images are forgotten. If the number of images available is small, the memory factor becomes bigger, so that the older images are not forgotten. A maximum memory factor could be set up to make sure that the maximum number of images considered is limited, thereby reducing the chance of clutter by limiting the map to more relevant information. If the number of images available is less than or equal to two, no image is forgotten. As an example, individual maps at times $T_N$, $T_{N\_1}$, $T_{N\_2}$, where N is number of images, are shown in FIG. 5. The resulting map is shown in FIG. 6, wherein the most recent positions, the next to most recent positions, and the oldest positions of the obstacles are shown in different hues or in varying intensity along with the overlapping areas of these positions.

The application of the Method For Near-Realtime Workspace Mapping as described until this point depends, at least in part, on color-based image segmentation. Therefore, its application may be limited if there is not a good contrast between the background and the obstacles or if the background is of a substantially uneven color. To account for the issues with these situations, a second obstacle detection technique may also be employed concurrently with the application as described until this point which uses tags such as Quick Response (QR) codes to identify known obstacles in the workspace. These techniques can be used concurrently to produce a complete map of the workspace. Moreover, even in applications which do not have the color-based issues, the present system may still be set up to use tags like QR codes to readily account for the dimensions of known obstacles including commonly reoccurring obstacles or permanent obstacles.

As previously discussed, because the performance of image-segmentation-based object detection technique can depend on the uniformity of the background and the contrast between the objects and the background, a QR code-based object detection technique may be combined with it to make it more robust.

Figure 7:
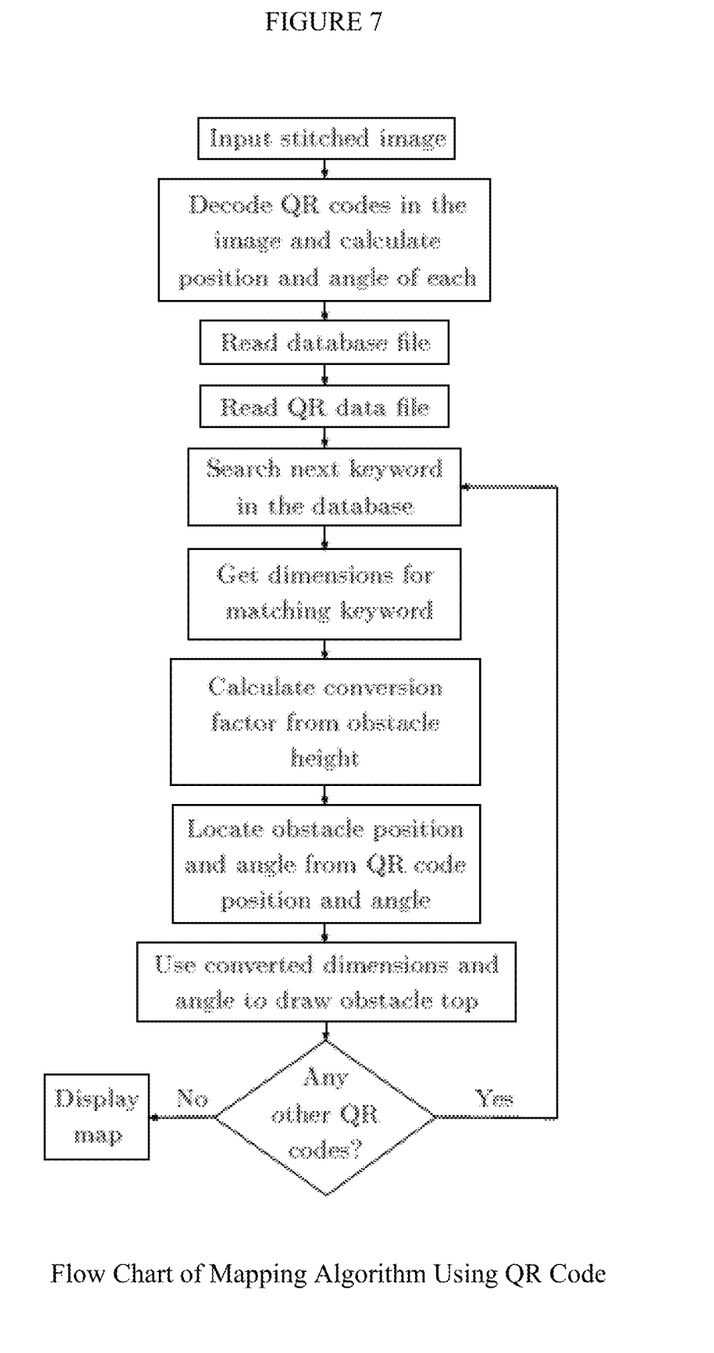
FIG. 7 depicts a flowchart of one embodiment of the disclosed method, describing the process of mapping obstacles within a machine's workspace using tagged obstacles.

In general, FIG. 7 shows the key steps of QR code-based portion of the mapping algorithm. In short, the most recent stitched image of the workspace is taken as the input to the mapping algorithm. All the QR codes in the stitched image are decoded, and the data are recorded. For each QR code found in the image, the database is searched for the matching object. When a match is found, the dimensions of the object and its relative position from the QR code are read from the database. The object position and orientation is calculated from the QR code position and orientation. Then, the top face of the object is drawn on the map. The process continues until all the objects labeled with QR codes read from the stitched image are drawn. Note, only obstacles labeled with QR codes are shown in this map. Therefore, this map will be combined with the image-segmentation-based map to obtain a more thoroughly complete map of the workspace.

More specifically, since the mapping technique using QR codes works only for known objects, a database containing object types and dimensions is necessary for the algorithm. The position of each QR code relative to the object onto which it is affixed is also listed in the database. Every object in the database file is assigned with a code, which is also encoded in the QR code of the corresponding object.

Figure 8:
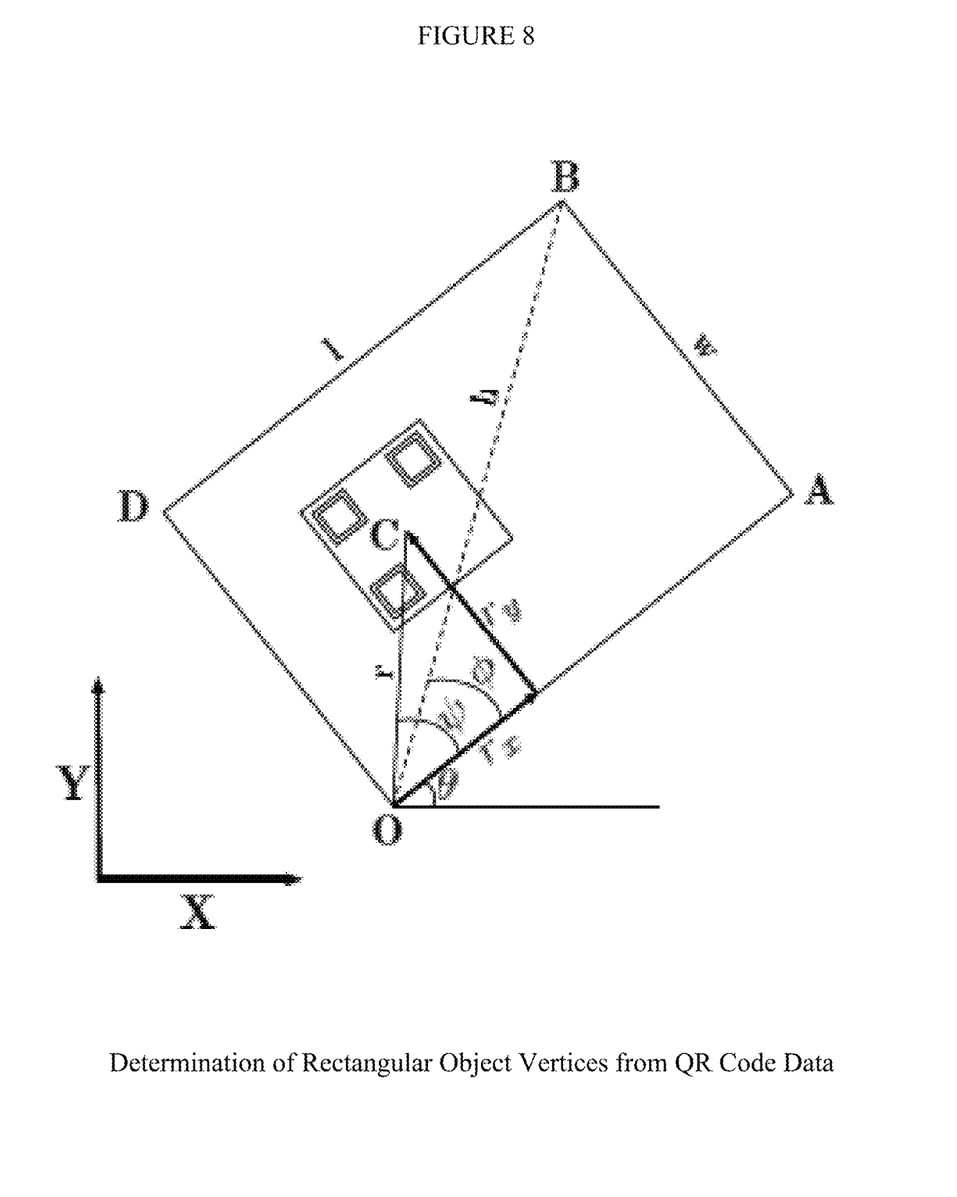
FIG. 8 shows a representative example of how the angle of the reading on the tag by the camera can be used to determine the location of the tagged obstacle.

An example data entry for rectangular objects is shown in Table 1. Here, machine1 is a rectangular object, and r1 is the keyword for machine1. The QR code center is placed at a distance of $(r_x, r_y)$ units from the origin, which in this case is the lower left vertex of the rectangle relative to the QR code, as shown in FIG. 8.

TABLE 1

Data Entry System for Rectangular object R1

| machine1 | $r_x$ | $r_y$ | length | width | height | rectangle |
|---|---|---|---|---|---|---|
| r1 | 10 | 9 | 21 | 17.25 | 15 | |

To generate the map from the QR code data, the database is searched with the keywords from the decoded QR codes. It is generally preferable, although not necessary, that every keyword corresponds to a unique object. When a match is found, the dimensions of the object and the position of the QR code relative to the object is read from the database. Then, the center position and angle of the QR code are calculated. The object position and orientation are calculated from the QR code position and orientation.

To draw rectangular objects, all the vertices are calculated from the center position and orientation of the QR code, as shown in FIG. 8. If the center of the QR code is C(x, y) and it is at an angle of θ with the horizontal axis, then the vertices O, A, B and D can be calculated using simple geometry.

After all the vertices are found for the rectangle, it can be drawn by connecting the vertices with straight lines. Objects of other shapes can be drawn in a similar manner. The colors or hues of the objects may be depicted differently from the ones used in the image-segmentation-based map, so that the objects can be discerned in the combination map discussed later.

Since the map is directly drawn from the dimensions specified in the database and the position and orientation of the QR codes, the accuracy of the map depends on the precision of measurements of the dimensions of the objects and the accuracy of placement of the QR codes. Distortion of the images captured by the camera, and distortion of the stitched image could also have an effect on the mapping accuracy.

It can also be difficult to know the height and relative size of the objects from a map. A small object may seem larger than a big one if it is higher than the big object, because the top face of the small object is closer to the camera. This problem can be solved by adding the depth information of the objects. The height can be written in plain text on each object. Another way that a sense of depth of the objects can be given is by drawing the base of the objects. The object bases in the map vary in size and color-intensity depending on their height. The base becomes smaller and less bright with increasing height. The contrast and relative size between the top and the base give a sense of height of the objects.

Since all the obstacles are not labeled with QR codes, the QR code-based mapping algorithm gives only a partial map of the workspace. To obtain a complete map of the workspace, the QR-code-based mapping method is combined with the image-segmentation-based mapping algorithm. To combine these two maps the QR code-based map is drawn directly over the image-segmentation-based map.

For the purpose of understanding the Method For Near-Realtime Workspace Mapping, references are made in the text to exemplary embodiments of a Method For Near-Realtime Workspace Mapping, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention. Further, the disclosed method could be implemented on other machine applications than cranes.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the method may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

The invention claimed is:

1. A method for providing workspace mapping comprising:
   (a) employing a camera in a designated position in the workspace;
   (b) when the camera is in the designated position, taking at least two images of the workspace with the camera wherein the workspace is divided into at least two segments and at least one image is taken at a designated position in each of the said at least two segments;
   (c) using image blurring to smooth the at least two images thereby reducing noise in the at least two images;
   (d) using foreground-background segmentation to detect and delineate obstacles in said at least two images;
   (e) drawing contours of said obstacles to produce one map of the workspace whereupon said obstacles are depicted wherein said at least two images are stitched together to form the one map of the workspace and template matching to mask portions of the workspace image from inclusion in the one map.

2. The method of claim 1 wherein obstacles are detected through foreground-background segmentation.

3. The method of claim 1 wherein the foreground-background segmentation comprises the act of determining pixel frequency of various portions of the image to separate workspace flooring from obstacles.

4. The method of claim 1 wherein the camera is set to automatically take a picture when it is located in a designated position.

5. The method of claim 1 wherein at least one obstacle is tagged with a tag which corresponds to known information about the at least one obstacle, and wherein the tag is capable of being read.

6. The method of claim 5 wherein the tag is a Quick Response ("QR") Code and wherein the system is capable of reading the QR Code to obtain the corresponding information.

7. The method of claim 6 further comprising the means of determining the location of the tagged obstacle by the reading of the QR Code.

8. The method of claim 5 wherein the camera is the QR scanner.

9. The method of claim 5 further comprising the step of providing a database of known information about the tagged obstacle wherein the information is selected from a group comprising the dimensions, shape, height, length, width of at least one tagged obstacle, or combinations thereof.

10. The method of claim 1 further comprising the step of determining whether older stored images of the workspace at the current position are available, wherein if such images are available taking the following steps: i) determining which stored images are newer than a memory factor; ii) determining which images should be incorporated based on the memory factor; iii) calculating the intensity of each individual image; and iv) overlaying individual images to produce a final map.

11. The method of claim 10 wherein the likelihood of finding an object in a particular area is illustrated based on the hue or intensity of object on the final map.

12. The method of claim 9 further comprising the steps of determining whether older stored images of the workspace at the current position are available, wherein if such images are available taking the following steps: i) determining which stored images are newer than a memory factor; ii) determining which images should be incorporated based on the memory factor; iii) calculating the intensity of each individual image; and iv) overlaying individual images to produce a final map.

13. A method for providing workspace mapping comprising:
   (a) employing a camera in a designated position in the workspace;
   (b) tagging known obstacles with a tag used to identify the obstacle;
   (c) when the camera is in the designated position, taking at least two images of the workspace with the camera wherein the workspace is divided into at least two segments, wherein at least one image is taken at a designated position in each of the said at least two segments;
   (d) using image blurring to smooth the at least one two images and thereby reducing noise in the at least two images;
   (e) using foreground-background segmentation, recognition of the tag, or both to detect and delineate obstacles in said at least two images; and
   (f) drawing contours of said obstacles to produce one map of the workspace whereupon said obstacles are depicted wherein said at least two images are stitched together to form the one map of the workspace;
   (g) using template matching to mask portions of the workspace image from inclusion in the map.

14. The method of claim 13 further comprising the step of providing a database of information on potential tagged obstacles wherein the information is selected from a group comprising the dimensions, shape, height, length, width, or combinations thereof.

15. A method for providing workspace mapping comprising:
   (a) a workspace comprising a floor and at least one obstacle;
   (b) a database with information on at least one potential obstacle, wherein the information is selected from a group comprising the dimensions, shape, height, length, width of at least one tagged obstacle, or combinations thereof;
   (c) tagging at least one obstacle in said workspace, wherein said tag corresponds to information contained in the database;
   (d) employing a camera in a designated position to view at least a portion of the workspace;
   (e) taking at least two images of the workspace with the camera when the camera is in a designated position, wherein said workspace is divided into at least two segments, wherein at least one image is taken at a designated position in each of the said at least two segments;
   (f) using image blurring to smooth the at least two images thereby reducing noise in the at least two images;
   (g) detecting and delineating obstacles in said at least two images through recognition of the tag, through foreground-background segmentation, or both;
   (h) drawing contours of said at least one obstacle to produce one map of the workspace whereupon said obstacles are depicted wherein said at least two images are stitched together to form the one map of the workspace;
   (i) using template matching to mask portions of the workspace image from inclusion in the one map; and
   (j) determining whether older stored images of the workspace at the current position are available, wherein if such images are available taking the following steps: i)

determining which stored images are newer than a memory factor; ii) determining which images should be incorporated based on the memory factor; iii) calculating the intensity of each individual image; and iv) overlaying individual images to produce a final map of the designated area.

16. The method of claim 15 wherein the tag is a QR Code and wherein the foreground-background segmentation is accomplished through a technique chosen from a group comprising watershed transformation, graph partitioning methods, region-growing methods, and integration of multiple cues.

17. The method of claim 2 wherein the foreground-background segmentation is accomplished through a method picked from the group comprising watershed transformation, graph partitioning methods, and region-growing methods, and integration of multiple cues.

\* \* \* \* \*